United States Patent
Fu et al.

(10) Patent No.: US 10,678,295 B2
(45) Date of Patent: Jun. 9, 2020

(54) METHOD AND DEVICE OF DATA CAPTURE

(71) Applicant: Au Optronics Corporation, Hsinchu (TW)

(72) Inventors: Jhih-Syuan Fu, Taichung (TW); Chun-Fan Chung, Taoyuan (TW); Chih-Fu Yang, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 207 days.

(21) Appl. No.: 16/000,826

(22) Filed: Jun. 5, 2018

(65) Prior Publication Data

US 2019/0258287 A1   Aug. 22, 2019

(30) Foreign Application Priority Data

Feb. 21, 2018   (TW) .............................. 107105764 A

(51) Int. Cl.
*G06F 1/08* (2006.01)
*G09G 3/20* (2006.01)

(52) U.S. Cl.
CPC .............. *G06F 1/08* (2013.01); *G09G 3/20* (2013.01); *G09G 2310/0264* (2013.01)

(58) Field of Classification Search
CPC ..... G06F 1/08; G09G 3/20; G09G 2310/0264
See application file for complete search history.

(56) References Cited

U.S. PATENT DOCUMENTS

| 6,288,589 | B1* | 9/2001 | Potter | G06F 5/015 327/295 |
| 6,288,699 | B1* | 9/2001 | Kubota | G09G 3/3648 345/213 |
| 7,030,657 | B2* | 4/2006 | Stojanovic et al. | G06F 11/0763 714/3 |
| 8,362,997 | B2 | 1/2013 | Huang et al. | |
| 2005/0097871 | A1* | 5/2005 | Glassman | B01D 46/10 55/385.1 |
| 2007/0030937 | A1* | 2/2007 | Yajima | H03L 7/0814 375/373 |
| 2007/0257877 | A1* | 11/2007 | Wang | G09G 3/20 345/98 |
| 2009/0085616 | A1 | 4/2009 | Wada et al. | |
| 2009/0189883 | A1* | 7/2009 | Chung | G09G 3/3674 345/213 |

(Continued)

*Primary Examiner* — Aurel Prifti
(74) *Attorney, Agent, or Firm* — JCIPRNET

(57) ABSTRACT

A data capture method and a data capture device are provided. The data capture method includes: receiving a data signal and a clock signal corresponding to the data signal; generating an auxiliary clock signal according to the clock signal, wherein phases of the clock signal and the auxiliary clock signal are different; sampling the data signal respectively according to the clock signal and the auxiliary clock signal to respectively obtain a plurality of data states and a plurality of edge sampling results; generating a plurality of pieces of edge information according to the data states and the corresponding edge sampling results, and performing an accumulation operation according to the edge information to generate a temporary value; and adjusting the clock signal according to the temporary value to generate an adjusted clock signal, and sampling the data signal according to the adjusted clock signal to obtain a plurality of transmission data.

20 Claims, 14 Drawing Sheets

(56) References Cited

U.S. PATENT DOCUMENTS

| | | | |
|---|---|---|---|
| 2011/0037758 A1 | 2/2011 | Lim et al. | |
| 2011/0181451 A1* | 7/2011 | Tsunoda | H03M 9/00 341/101 |
| 2012/0081158 A1* | 4/2012 | Mateman | H03L 7/0991 327/156 |
| 2012/0200328 A1* | 8/2012 | Yao | H03L 7/1976 327/157 |
| 2013/0009679 A1* | 1/2013 | Sindalovsky | H03L 7/00 327/147 |
| 2013/0127806 A1* | 5/2013 | Wu | G09G 3/3688 345/211 |
| 2014/0232755 A1* | 8/2014 | Wang | G09G 5/10 345/690 |
| 2014/0281662 A1* | 9/2014 | Gopalan | G06F 11/0763 714/3 |
| 2015/0229314 A1* | 8/2015 | Hata | H03K 3/037 327/218 |
| 2016/0063957 A1* | 3/2016 | Shirasaki | G09G 3/20 345/213 |
| 2016/0116936 A1* | 4/2016 | Jeong | G06F 1/08 713/503 |
| 2016/0300544 A1* | 10/2016 | Ding | G09G 3/3696 |
| 2016/0308540 A1* | 10/2016 | Subramanian | G06F 13/1689 |
| 2017/0207779 A1* | 7/2017 | Chen | H03L 7/099 |

* cited by examiner

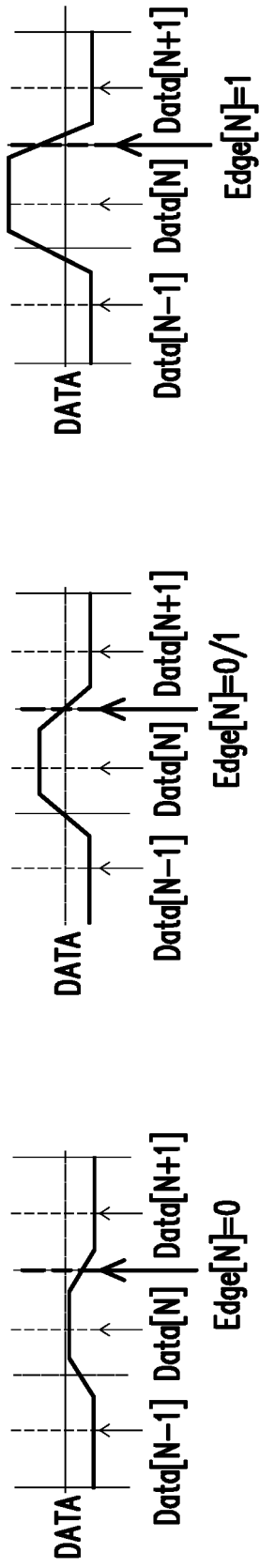
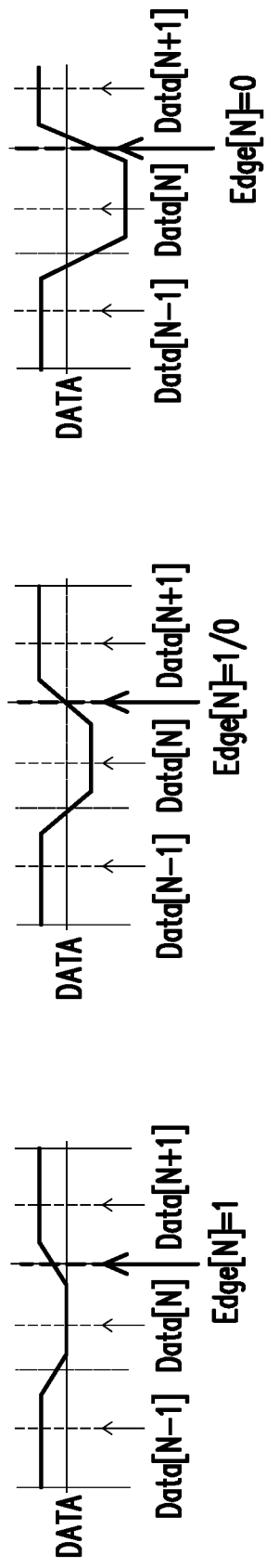
FIG. 8A
FIG. 8B
FIG. 8C
FIG. 8D
FIG. 8E
FIG. 8F

METHOD AND DEVICE OF DATA CAPTURE

CROSS-REFERENCE TO RELATED APPLICATION

This application claims the priority benefit of Taiwan application serial no. 107105764, filed on Feb. 21, 2018. The entirety of the above-mentioned patent application is hereby incorporated by reference herein and made a part of this specification.

BACKGROUND OF THE INVENTION

Field of the Invention

The disclosure provides a data capture method and a data capture device, and in particular, to a data capture method and a data capture device that enhance data transmission rates by adding an auxiliary clock signal to enable the data capture device to learn to autonomously adjust parameters related to completeness of signals.

Description of Related Art

As display panel resolutions and frame rates increase, there is a higher demand for display data transmission rates. However, on a data transmission path, the data transmission rate is often limited due to resistive-capacitive delay (RC delay) and jitter. Therefore, many developments and applications of relevant techniques on a driving circuit of a display panel have been proposed, including an embedded clock and an equalizer.

However, since a phase difference is present between a clock signal and a data signal generated by a source driver via a clock-data-recovery (CDR) circuit, when data is captured, a set up time or a hold time is not in an optimal state, and as the transmission rate is increased to a certain extent, errors occur when data is received. Moreover, due to differences in manufacturing processes and operation environments, the same equalization settings are not applicable to all displays. Therefore, there is a need to develop a driving device capable of self-training to adjust parameters related to completeness of signals.

SUMMARY OF THE INVENTION

The embodiments of the invention provide a data capture method and a data capture device that autonomously adjust settings related to completeness of signals to be used at higher data transmission rates and ensure accuracy of the received data.

The data capture method of the embodiments of the invention includes the following steps. A data signal and a clock signal corresponding to the data signal are received. An auxiliary clock signal is generated according to the clock signal, wherein phases of the clock signal and the auxiliary clock signal are different. The data signal is sampled respectively according to the clock signal and the auxiliary clock signal to respectively obtain a plurality of data states and a plurality of edge sampling results. A plurality of pieces of edge information are generated according to the data states and the edge sampling results respectively corresponding to the data states, and an accumulation operation is performed according to the pieces of edge information to generate a temporary value. The clock signal is adjusted according to the temporary value to generate an adjusted clock signal, and the data signal is sampled according to the adjusted clock signal to obtain a plurality of transmission data.

In an embodiment of the invention, the step of generating the auxiliary clock signal according to the clock signal in the data capture method includes the following step. The clock signal is inverted to generate the auxiliary clock signal.

In an embodiment of the invention, in the data capture method, the clock signal is an externally received clock signal or is an embedded clock signal.

In an embodiment of the invention, the step of generating the pieces of edge information according to the data states and the edge sampling results respectively corresponding to the data states in the data capture method includes the following steps. When two adjacent data states are sequentially a first logic level and a second logic level, the edge sampling results between the two adjacent data states are configured to be equal to the corresponding pieces of edge information. When the two adjacent data states are sequentially the second logic level and the first logic level, the corresponding pieces of edge information are generated according to the edge sampling results corresponding in an inverted manner. Specifically, the first logic level is a low logic level, and the second logic level is a high logic level.

In an embodiment of the invention, the step of generating the pieces of edge information according to the data states and the edge sampling results respectively corresponding to the data states in the data capture method includes the following steps. When three adjacent data states are sequentially a first logic level, a second logic level, and the first logic level, the edge sampling results corresponding to the three adjacent data states are configured to be equal to the corresponding pieces of edge information. When the three adjacent data states are sequentially the second logic level, the first logic level, and the second logic level, the corresponding pieces of edge information are generated according to the edge sampling results corresponding to the three adjacent data states in an inverted manner. Specifically, the first logic level is a low logic level, and the second logic level is a high logic level.

In an embodiment of the invention, the step of performing the accumulation operation according to the pieces of edge information to generate the temporary value in the data capture method includes the following step. The pieces of edge information are added up to generate the temporary value in a correction time period.

In an embodiment of the invention, the step of adjusting the clock signal according to the temporary value to generate the adjusted clock signal in the data capture method includes the following steps. A sampling total count of sampling the data signal according to the clock signal or the auxiliary clock signal is calculated in a correction time period. A division operation is performed on the temporary value and the sampling total count to generate a ratio. A magnitude relationship between the ratio and a default first threshold value and a default second threshold value is compared and a comparison result is generated. A phase or an equalization intensity of the clock signal is adjusted according to the comparison result to generate the adjusted clock signal. Specifically, the first threshold value is smaller than the second threshold value, and the first threshold value is larger than 0.

In an embodiment of the invention, the step of adjusting the phase or the equalization intensity of the clock signal according to the comparison result to generate the adjusted clock signal in the data capture method includes the following steps. When the ratio is larger than or equal to 0 and the ratio is smaller than the first threshold value, the phase of the clock signal is advanced to generate the adjusted clock signal. When the ratio is larger than or equal to the first threshold value and the ratio is smaller than the second threshold value, the phase of the clock signal is held unchanged to generate the adjusted clock signal. When the ratio is larger than or equal to the second threshold value, the phase of the clock signal is delayed to generate the adjusted clock signal.

In an embodiment of the invention, the step of adjusting the phase or the equalization intensity of the clock signal according to the comparison result to generate the adjusted clock signal in the data capture method includes the following steps. When the ratio is larger than or equal to 0 and the ratio is smaller than the first threshold value, the equalization intensity of the clock signal is increased to generate the adjusted clock signal. When the ratio is larger than or equal to the first threshold value and the ratio is smaller than the second threshold value, the equalization intensity of the clock signal is maintained to generate the adjusted clock signal. When the ratio is larger than or equal to the second threshold value, the equalization intensity of the clock signal is reduced to generate the adjusted clock signal.

The data capture device of the embodiments of the invention includes a data reception circuit, a clock signal generation circuit, and a control circuit. The data reception circuit receives a data signal, a clock signal corresponding to the data signal, and an auxiliary clock signal to sample the data signal respectively according to the clock signal and the auxiliary clock signal to respectively obtain a plurality of data states and a plurality of edge sampling results. The clock signal generation circuit is coupled to the data reception circuit and generates the auxiliary clock signal according to the clock signal, wherein phases of the clock signal and the auxiliary clock signal are different. The control circuit is coupled to the data reception circuit and the clock signal generation circuit and is configured to generate a plurality of pieces of edge information according to the data states and the edge sampling results respectively corresponding to the data states and perform an accumulation operation according to the pieces of edge information to generate a temporary value, and generate an adjustment command according to the temporary value and transmit the adjustment command to the clock signal generation circuit. The clock signal generation circuit adjusts the clock signal according to the adjustment command to generate an adjusted clock signal, and the data reception circuit receives the adjusted clock signal and samples the data signal according to the adjusted clock signal to obtain a plurality of transmission data.

Accordingly, in the embodiments of the invention, the data state of the data signal is sampled by additionally including an auxiliary clock signal having a phase different from the clock signal in the data capture device. Next, the edge information is generated according to the sampled edge sampling result, and then the accumulation operation is performed to generate the temporary value. Then, the state relationship between the data signal and the clock signal is determined according to the accumulated temporary value. Lastly, the clock signal is adjusted according to the state relationship between the two to enable the data capture device to learn to autonomously adjust completeness of signals, such that use at higher data transmission rates can be possible, and accuracy of the received data can be ensured.

To provide a further understanding of the aforementioned and other features and advantages of the disclosure, exemplary embodiments, together with the reference drawings, are described in detail below.

BRIEF DESCRIPTION OF THE DRAWINGS

FIG. 8A to FIG. 8F are schematic diagrams illustrating correspondences between data states and equalization intensities at the time of data transition according to an embodiment of the invention.

DESCRIPTION OF THE EMBODIMENTS

Figure 1:
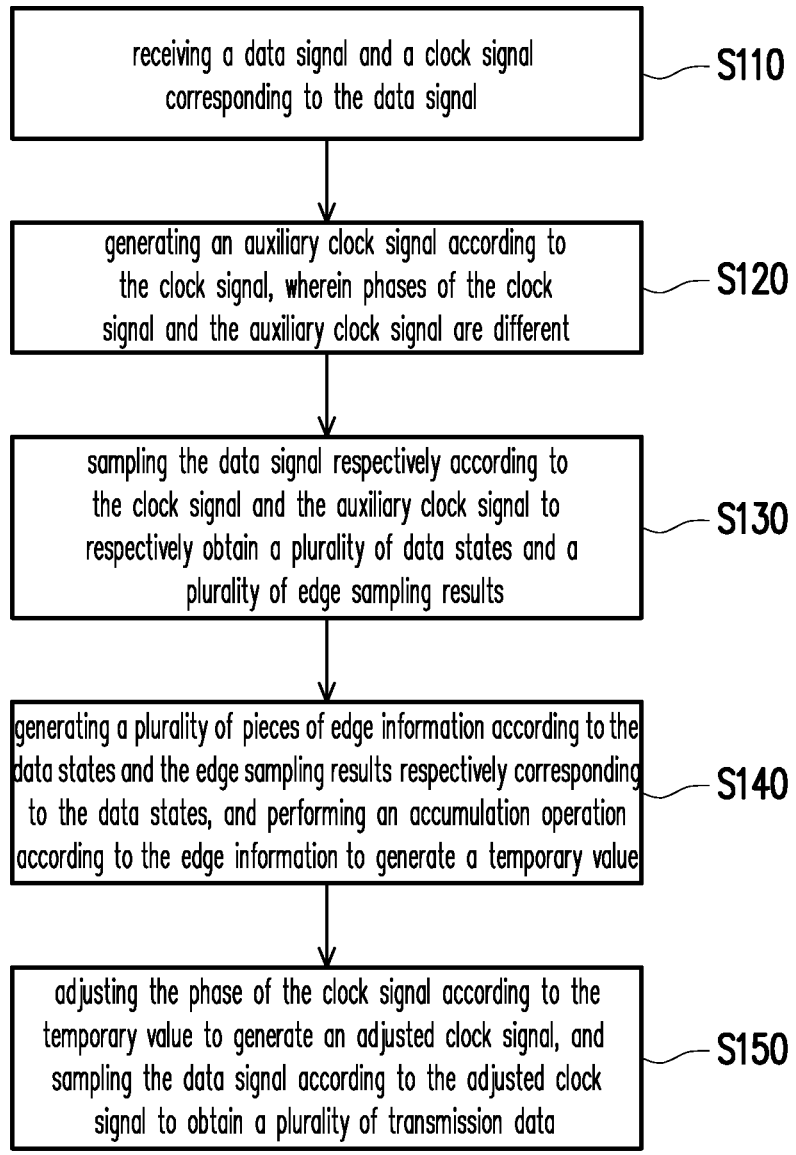
FIG. 1 is a flowchart illustrating a data capture method according to an embodiment of the invention.

Referring to FIG. 1, FIG. 1 is a flowchart illustrating a data capture method according to an embodiment of the invention. In a process of the data capture method, in step S110, an operation of receiving a data signal and a clock signal corresponding to the data signal is performed. Next, in step S120, an auxiliary clock signal is generated according to a phase of the clock signal. For example, the auxiliary clock signal may be generated by changing the phase of the clock signal, such that a phase difference between the clock signal and the auxiliary clock signal is 180°, for example (the clock signal and the auxiliary clock signal are inverted signals to each other). Moreover, in step S130, the data signal is sampled according to the clock signal and a positive transition edge of the auxiliary clock signal to respectively obtain a plurality of data states and a plurality of edge sampling results. Specifically, each of the data states may be a low logic level or a high logic level, and each of the edge sampling results may also be a low logic level or a high logic level. In step S140, a plurality of pieces of edge information are generated according to the obtained data states and the edge sampling results respectively corresponding to the data states, and an accumulation operation is performed according to the edge information to generate a temporary value. Lastly, in step S150, the phase of the clock signal is adjusted according to the temporary value to generate an adjusted clock signal, and the data signal is sampled according to the adjusted clock signal to obtain a plurality of transmission data.

It is noted that the data capture method of the present embodiment is applicable to a display device. For example, a source driver in a display device may perform a data reception operation according to the operation process of the present embodiment to ensure accuracy of the received data. Moreover, in the data capture method of the present embodiment, the clock signal may be an externally received clock signal or may be an embedded clock signal generated from a decoding operation performed by a clock-data-recovery (CDR) circuit.

Figure 2:
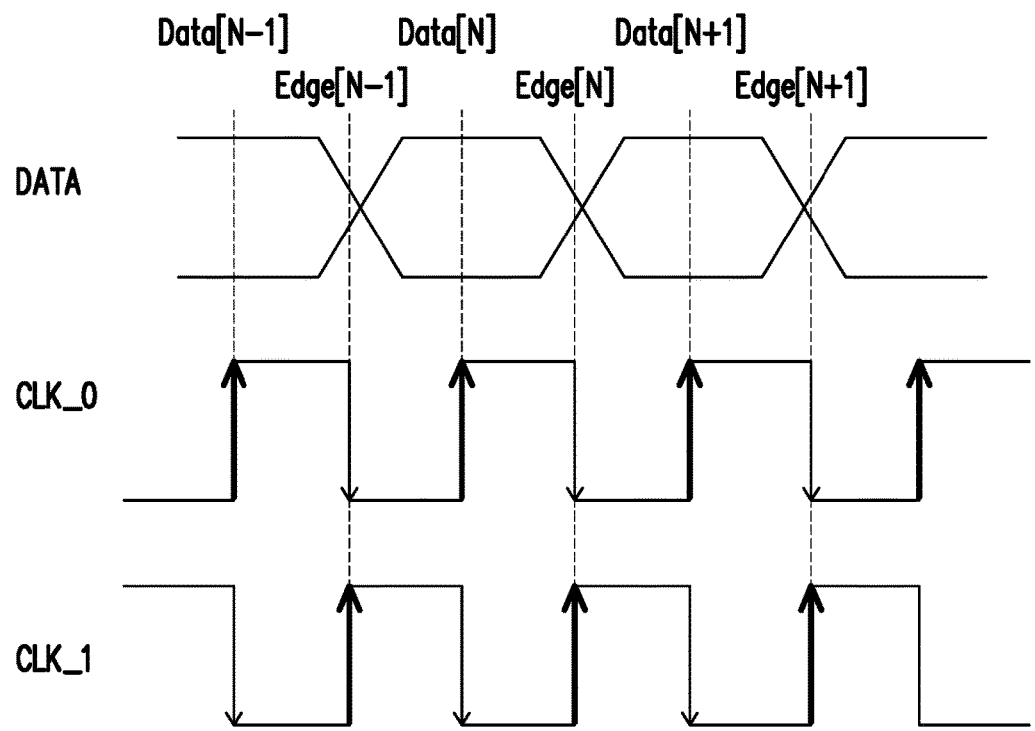
FIG. 2 illustrates a data signal waveform diagram of a data capture method according to an embodiment of the invention.

Referring to FIG. 2, FIG. 2 illustrates a data signal waveform diagram of a data capture method according to an embodiment of the invention. In the present embodiment, an auxiliary clock signal CLK_1 is generated by phase-delaying a clock signal CLK_0. Specifically, the auxiliary clock signal CLK_1 has a phase difference of 180° based on the clock signal CLK_0. The clock signal CLK_0 and the auxiliary clock signal CLK_1 may be simultaneously used to sample a data signal DATA to respectively obtain a plurality of data states Data[N−1], Data[N], and Data[N+1] and a plurality of edge sampling results Edge[N−1], Edge[N], and Edge[N+1] respectively corresponding to the data states. A plurality of pieces of edge information (which may be, for example, the edge sampling result Edge[N] or a complement of the edge sampling result Edge[N]) are generated according to the plurality of data states Data[N−1], Data[N], and Data[N+1] and the plurality of edge sampling results Edge[N−1], Edge[N], and Edge[N+1]. Lastly, an accumulation operation is performed by using the plurality of pieces of edge information, and, according to a temporary value generated from the accumulation operation, it is determined whether a phase relationship between the data signal DATA and the clock signal CLK_0 is leading or lagging at this time to adjust the clock phase accordingly; alternatively, it is determined whether an equalization intensity (i.e., a voltage amplitude of the data signal DATA) of the data signal DATA with respect to the clock signal CLK_0 is larger or smaller to adjust the equalization intensity accordingly. A data capture device is configured to learn to autonomously adjust parameters related to completeness of signals, such that it can receive data with optimal settings in various environments to ensure accuracy of the received data when used at higher data transmission rates.

Figures 3A, 3B, 3C:
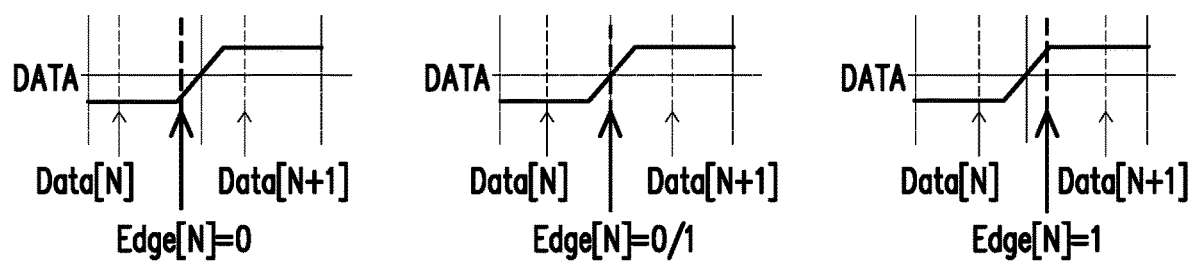
FIG. 3A to FIG. 3F are schematic diagrams illustrating correspondences between data states and edge sampling results at the time of data transition according to an embodiment of the invention.

Referring to FIG. 3A to FIG. 3F, FIG. 3A to FIG. 3F are schematic diagrams illustrating correspondences between data states and edge sampling results at the time of data transition according to an embodiment of the invention. Referring to FIG. 3A to FIG. 3C, FIG. 3A to FIG. 3C illustrate correspondences between the data states and the edge sampling results when the data signal DATA undergoes a transition from a low logic level to a high logic level. When a change between two adjacent data states Data[N] and Data[N+1] is sequentially a first logic level (e.g., a low logic level, i.e., 0) and a second logic level (e.g., a high logic level, i.e., 1), the pieces of edge information identical to the edge sampling results Edge[N] are generated according to the change between the two adjacent data states Data[N] and Data[N+1] from 0 to 1.

In FIG. 3A, using a single time cycle as an example, when the data signal DATA is a phase leading state with respect to the clock signal CLK_0, the edge sampling result Edge[N] sampled according to the positive transition edge of the auxiliary clock signal CLK_1 should be 0. In FIG. 3B, similarly using a single time cycle as an example, when the data signal DATA is in an in-phase state with the clock signal CLK_0, the edge sampling result Edge[N] sampled according to the positive transition edge of the auxiliary clock signal CLK_1 may be 0 or may be 1. In FIG. 3C, similarly using a single time cycle as an example, when the data signal DATA is in a phase lagging state with respect to the clock signal CLK_0, the edge sampling result Edge[N] sampled according to the positive transition edge of the auxiliary clock signal CLK_1 should be 1.

According to the description above, under the condition that the change between the data states Data[N] and Data[N+1] is 0 to 1, in a single correction time period, the temporary value is generated by accumulating the plurality of pieces of edge information of a plurality of time cycles, and a sampling total count of sampling the data signal DATA according to the clock signal CLK_0 or the auxiliary clock signal CLK_1 is calculated. Moreover, phase states of the data signal DATA and the clock signal CLK_0 may be learned according to a magnitude of the temporary value. In other words, when a ratio (generated by dividing the temporary value by the sampling total count) is not smaller than 0 and is smaller than a first threshold value, it means that the data signal DATA is in a phase leading state with respect to the clock signal CLK_0. When the ratio is not smaller than the first threshold value and is smaller than a second threshold value, it means that the data signal DATA and the clock signal CLK_0 are in an in-phase state. When the ratio is not smaller than the second threshold value, it means that the data signal DATA is in a phase lagging state with respect to the clock signal CLK_0. Specifically, the first threshold value is smaller than the second threshold value, and the first threshold value is larger than 0.

It is noted that the correction time period of the present embodiment may take place in any time period and is not specifically limited. For example, when the data capture method of the present embodiment is applied to a display device, the correction time period may be an additionally provided time period, or may overlap with a display time period in which the display device performs a display operation. In other words, the correction time period of the present embodiment may be synchronous or asynchronous with the display time period of the display device.

Figure 3D:
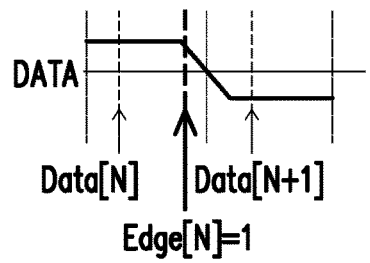
Figure 3E:
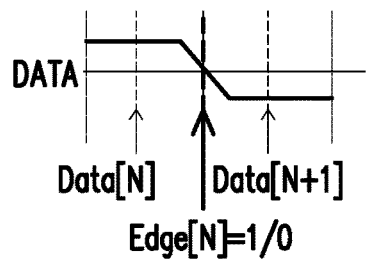
Figure 3F:
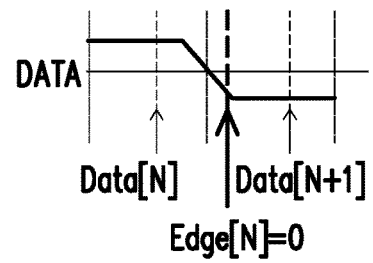

On the other hand, referring to FIG. 3D to FIG. 3F, FIG. 3D to FIG. 3F illustrate correspondences between the data state Data[N] and the edge sampling result Edge[N] when the data signal DATA undergoes a transition from a high logic level to a low logic level. When the change between the two adjacent data states Data[N] and Data[N+1] is 1 and 0, the pieces of edge information are generated as the complements of the edge sampling results Edge[N] according to the change between the two adjacent data states Data[N] and Data[N+1] from 1 to 0.

In other words, in FIG. 3D, using a single time cycle as an example, when the data signal DATA is in a phase leading state with respect to the clock signal CLK_0, the edge sampling result Edge[N] sampled according to the positive transition edge of the auxiliary clock signal CLK_1 should be 1. In FIG. 3E, similarly using a single time cycle as an example, when the data signal DATA is in an in-phase state with the clock signal CLK_0, the edge sampling result Edge[N] sampled according to the positive transition edge of the auxiliary clock signal CLK_1 may be 1 or may be 0. In FIG. 3F, similarly using a single time cycle as an example, when the data signal DATA is in a phase lagging state with respect to the clock signal CLK_0, the edge sampling result Edge[N] sampled according to the positive transition edge of the auxiliary clock signal CLK_1 should be 0.

According to the description above, under the condition that the change between the data states Data[N] and Data[N+1] is 1 to 0, the phase states of the data signal DATA and the clock signal CLK_0 are determined similarly based on a comparison result between the ratio and the first threshold value and the second threshold value. The difference from the condition that the change between the data states Data[N] and Data[N+1] is 0 to 1 in FIG. 3A to FIG. 3C merely lies in that the pieces of edge information for performing the accumulation operation are the complements of the edge sampling results Edge[N].

Figure 4A:
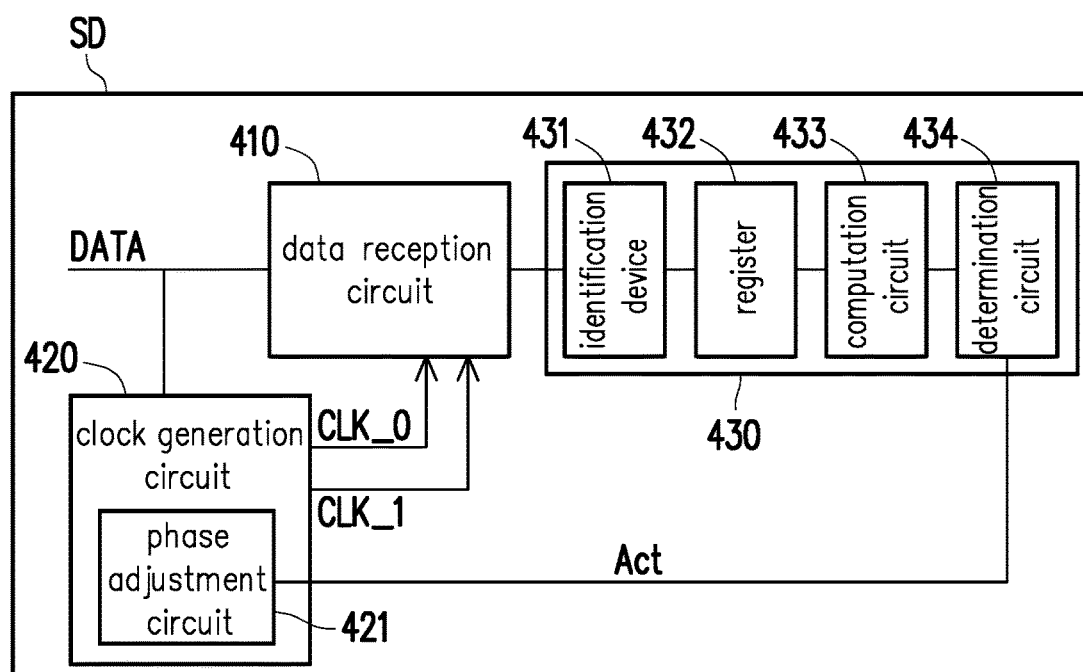
FIG. 4A is a circuit block schematic diagram illustrating an implementation of adjusting a clock phase of a data capture device according to an embodiment of the invention.

Referring to FIG. 4A, FIG. 4A is a circuit block schematic diagram illustrating an implementation of adjusting a clock phase of a data capture device according to an embodiment of the invention. In the present embodiment, a source driver SD of a data capture device 400 includes a data reception circuit 410, a clock generation circuit 420, and a control circuit 430. The clock generation circuit 420 is coupled to the data reception circuit 410, and the control circuit 430 is coupled to the clock generation circuit 420 and the data reception circuit 410. A phase adjustment circuit 421 is disposed in the clock generation circuit 420. The control circuit 430 includes an identification device 431, a register 432, a computation circuit 433, and a determination circuit 434 coupled to each other.

Figure 4B:
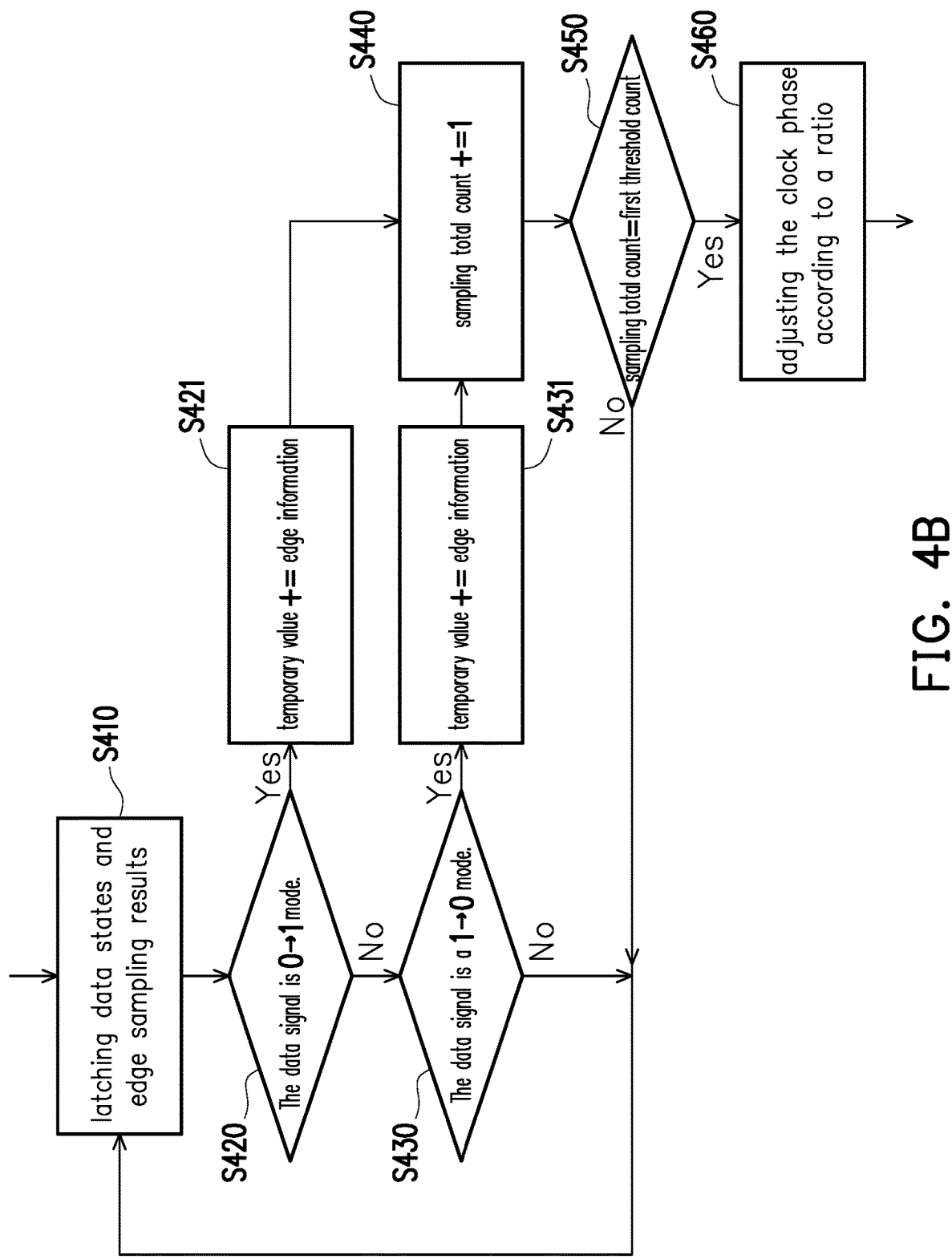
FIG. 4B is a flowchart illustrating an implementation of adjusting a clock phase of a data capture method of the embodiment of FIG. 4A.

Referring to both FIG. 4A and FIG. 4B for a description of detailed operations, FIG. 4B is a flowchart illustrating an implementation of adjusting a clock phase of a data capture method of the embodiment of FIG. 4A. First, the data reception circuit 410 performs an operation of receiving a data signal DATA. Next, in step S410, the identification device 431 performs a latch operation on a plurality of data states Data[N-1], Data[N], and Data[N+1] and a plurality of edge sampling results Edge[N-1], Edge[N], and Edge[N+1]. In step S420, a determination is performed on two adjacent data states Data[N-1] and Data[N]. If a condition that Data[N-1] is 0 and Data[N] is 1 is met (i.e., a state of the data signal DATA is a 0-to-1 mode), edge information identical to the edge sampling result Edge[N] is generated. Moreover, in step S421, the computation circuit 433 performs an accumulation operation on the edge information to generate a temporary value REG1, wherein "+=" is a symbol for an accumulation operation. If the condition that Data[N-1] is 0 and Data[N] is 1 is not met, the identification device 431 enters step S430 to perform a determination.

In step S430, if a condition that Data[N-1] is 1 and Data[N] is 0 is not met, returning to step S410 to continue to perform data latching. If the condition that Data[N-1] is 1 and Data[N] is 0 is met (i.e., the state of the data signal DATA is a 1-to-0 mode), edge information which is a complement of the edge sampling result Edge[N] is generated. Moreover, in step S431, the computation circuit 433 performs an accumulation operation on the edge information to generate the temporary value REG1. After the accumulation operations of steps S421 and S431 are completed, the computation circuit 433 performs an accumulation operation of a sampling total count count_1 in step S440, and performs a determination in step S450. If the sampling total count count_1 does not reach a count of a first threshold count Nth_1, returning to step S410 to continue to perform data latching.

Conversely, if the sampling total count count_1 reaches the first threshold count Nth_1, entering step S460, the computation circuit 433 performs a division operation on the temporary value REG1 and the sampling total count count_1 to generate a ratio Ratio_1. The determination circuit 434 generates a comparison result according to a magnitude relationship between the ratio Ratio_1 and a default first threshold value Thedg1 and a default second threshold value Thedg2, and generates an adjustment command Act according to the comparison result. The phase adjustment circuit 421 adjusts the phase of the clock signal CLK_0 according to the adjustment command Act to generate an adjusted clock signal, and the data signal DATA is sampled according to the adjusted clock signal to obtain a plurality of transmission data.

TABLE 1

| Comparison result | Clock phase adjustment operation |
| --- | --- |
| 0 ≤ Ratio_1 < Thedg1 | Advancing clock phase |
| Thedg1 ≤ Ratio_1 ≤ Thedg2 | Maintaining clock phase |
| Thedg2 < Ratio_1 ≤ 1 | Delaying clock phase |

In Table 1, the comparison result refers to a result generated after comparing the magnitude relationship between the ratio Ratio_1 and the default first threshold value Thedg1 and second threshold value Thedg2, and the clock phase adjustment operation refers to an operation required for adjusting the phase of the clock when different comparison results are obtained based on the ratio Ratio_1.

Regarding details of the adjustment operation, when the ratio Ratio_1 is larger than or equal to 0 and the ratio Ratio_1 is smaller than the first threshold value Thedg1, the adjustment command Act for advancing the phase of the clock signal CLK_0 is generated to adjust the clock signal CLK_0. When the ratio Ratio_1 is larger than or equal to the first threshold value Thedg1 and the ratio Ratio_1 is smaller than the second threshold value Thedg2, the adjustment command Act for holding the phase of the clock signal CLK_0 unchanged is generated to adjust the clock signal CLK_0. When the ratio Ratio_1 is larger than or equal to the second threshold value Thedg2, the adjustment command Act for delaying the phase of the clock signal CLK_0 is generated to adjust the clock signal CLK_0.

Figure 5A:
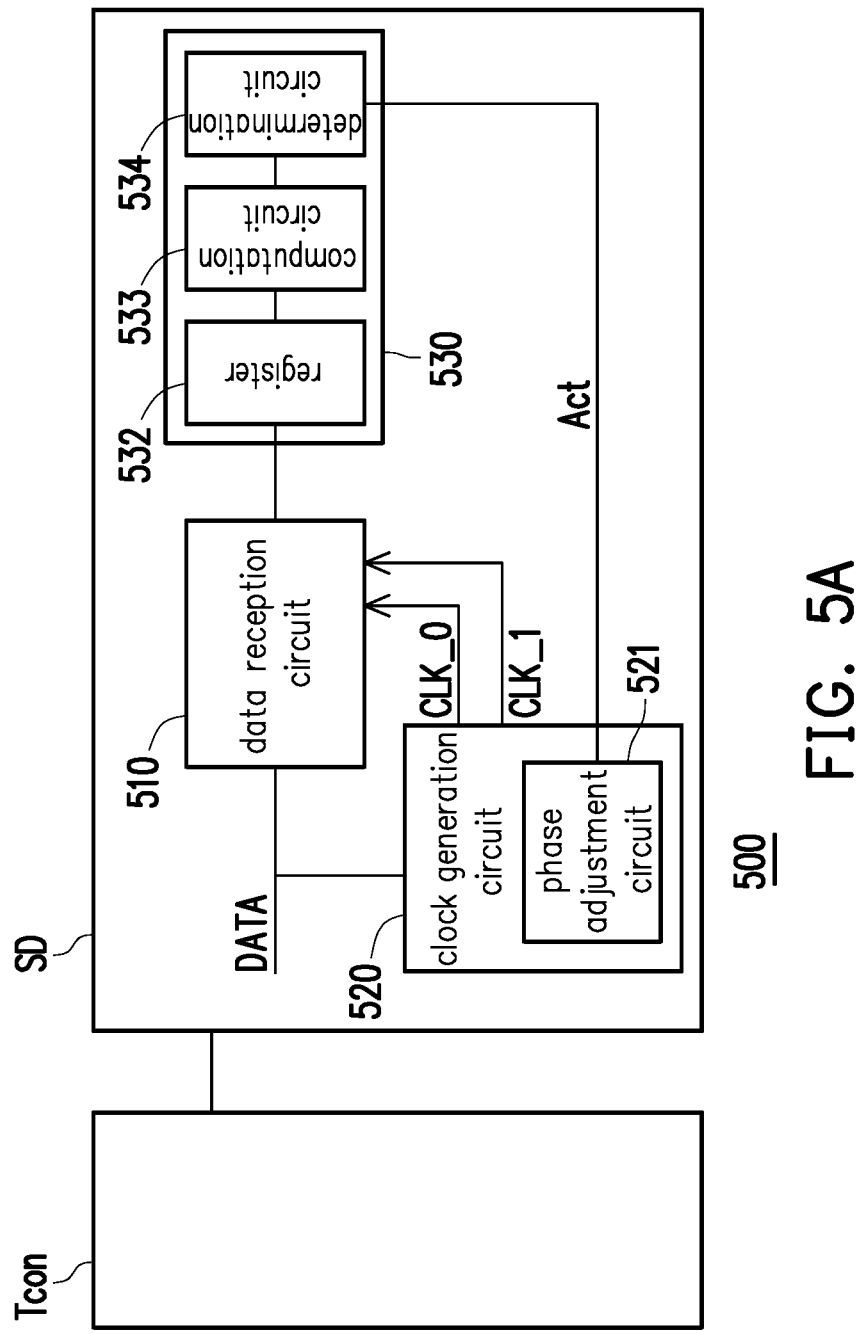
FIG. 5A is a circuit block schematic diagram illustrating an implementation of adjusting a clock phase of a data capture device according to another embodiment of the invention.
Figure 5B:
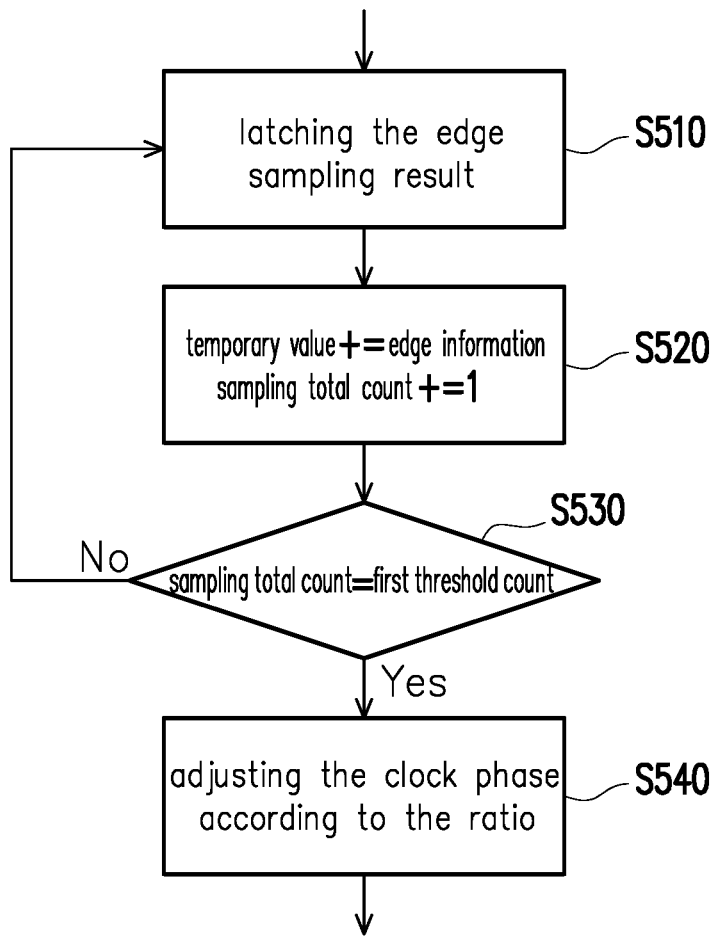
FIG. 5B is a flowchart illustrating an implementation of adjusting a clock phase of a data capture method of the embodiment of FIG. 5A.

Referring to both FIG. 5A and FIG. 5B, FIG. 5A is a circuit block schematic diagram illustrating an implementation of adjusting a clock phase of a data capture device according to another embodiment of the invention. FIG. 5B is a flowchart illustrating an implementation of adjusting a clock phase of a data capture method of the embodiment of FIG. 5A. The difference from the embodiment of FIG. 4A lies in that, in the present embodiment, the identification device 431 in the data capture device 400 is integrated and is replaced with a timing controller Tcon of a data capture device 500 of the present embodiment. Therefore, in the present embodiment, by setting the timing controller Tcon and a source driver SD to perform a transition from 0 to 1

(or a transition from 1 to 0) at a predetermined bit address, edge information is generated directly according to an edge sampling result Edge[N] sampled at the predetermined bit address (or a complement of the edge sampling result Edge[N]), and an accumulation operation is performed on the edge information to generate the temporary value REG1, which simplifies the process of the data capture method described in the foregoing embodiment.

In other words, the data capture device 500 of the present embodiment includes the timing controller Tcon and the source driver SD. The source driver SD includes a data reception circuit 510, a clock generation circuit 520, and a control circuit 530. The clock generation circuit 520 is coupled to the data reception circuit 510, and the control circuit 530 is coupled to the clock generation circuit 520 and the data reception circuit 510. A phase adjustment circuit 521 is disposed in the clock generation circuit 520. The control circuit 530 includes a register 532, a computation circuit 533, and a determination circuit 534 coupled to each other. The data reception circuit 510 receives a data signal DATA, a clock signal CLK_0 corresponding to the data signal DATA, and an auxiliary clock signal CLK_1, and latches the edge sampling result Edge[N] (or the complement of the edge sampling result Edge[N]) in step S510. The computation circuit 533 then performs an accumulation operation on the edge information in step S520 to generate a temporary value REG1 and meanwhile performs an accumulation operation of a sampling total count count_1, and performs a determination in step S530. If the sampling total count count_1 does not reach the first threshold count Nth_1, returning to step S510 to continue to perform data latching. Conversely, if the sampling total count count_1 reaches the first threshold count Nth_1, entering step S540, the computation circuit 533 performs a division operation on the temporary value REG1 and the sampling total count count_1 to generate a ratio Ratio_1. Subsequent operations of adjusting the clock signal CLK_0 are similar to the operations of adjusting the clock signal CLK_0 by the data capture device 400, which shall not be repeatedly described here.

Figure 6A:
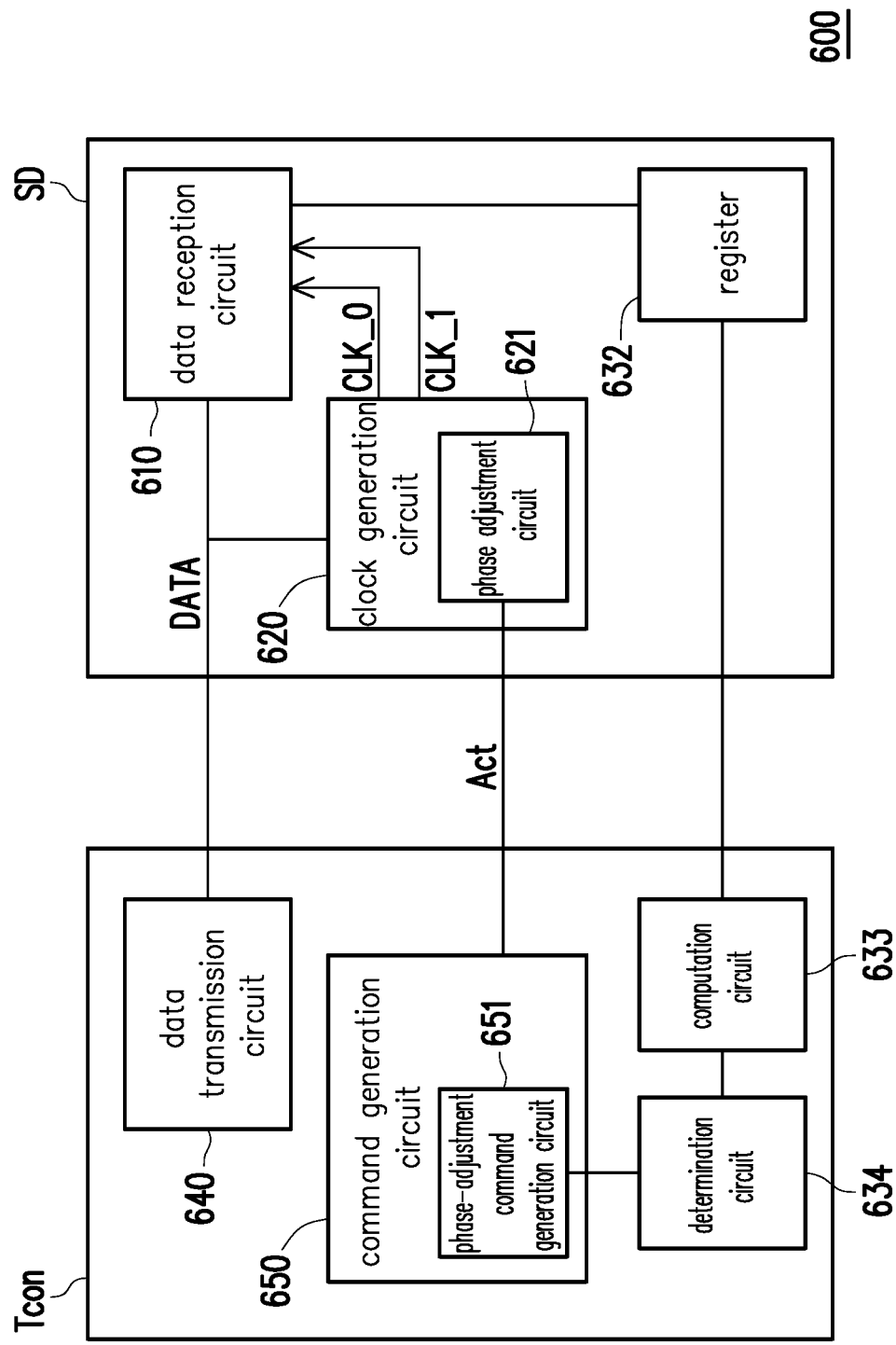
FIG. 6A is a circuit block schematic diagram illustrating an implementation of adjusting a clock phase of a data capture device according to another embodiment of the invention.
Figure 6B:
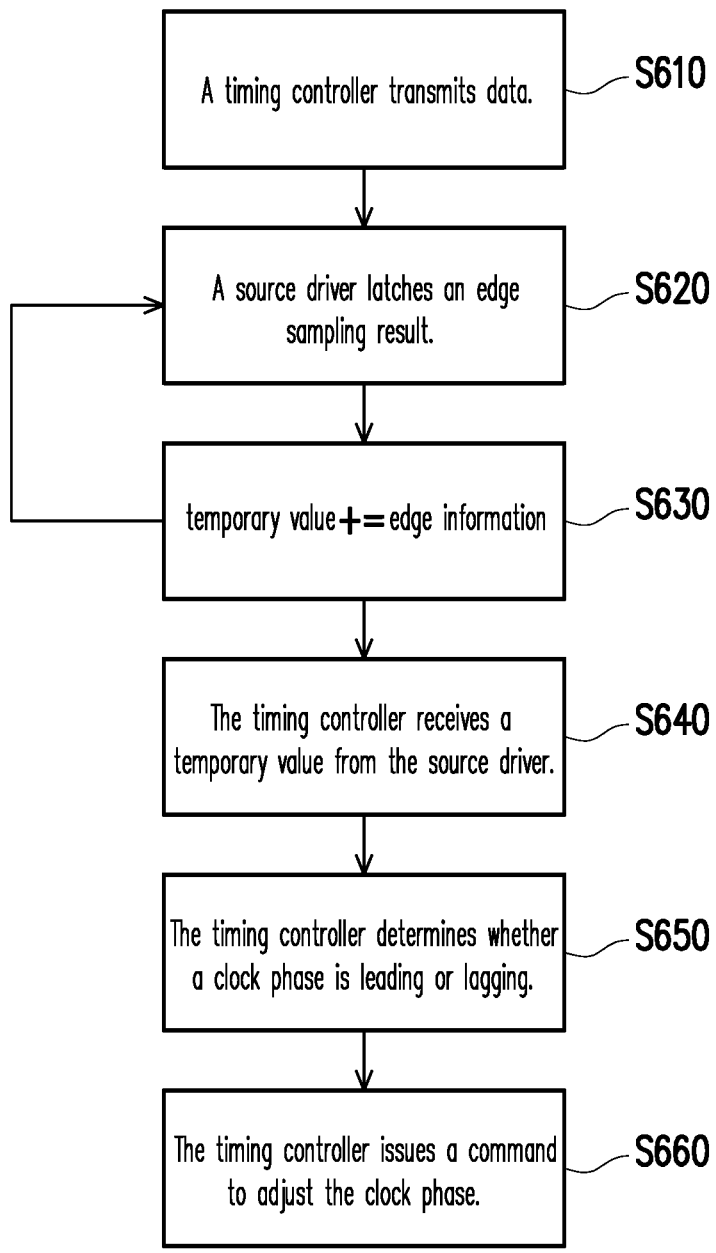
FIG. 6B is a flowchart illustrating an implementation of adjusting a clock phase of a data capture method of the embodiment of FIG. 6A.

Referring to both FIG. 6A and FIG. 6B, FIG. 6A is a circuit block schematic diagram illustrating an implementation of adjusting a clock phase of a data capture device according to another embodiment of the invention. FIG. 6B is a flowchart illustrating an implementation of adjusting a clock phase of a data capture method of the embodiment of FIG. 6A. The difference from the embodiment of FIG. 5A lies in that, in the present embodiment, the computation circuit 532 and the determination circuit 533 in the data capture device 500 are integrated in a timing controller Tcon of a data capture device 600 of the present embodiment, which simplifies a circuit of a source driver SD and the process of the data capture method described in the foregoing embodiment.

The data capture device 600 of the present embodiment includes the timing controller Tcon and the source driver SD coupled to each other. The source driver SD includes a data reception circuit 610, a clock generation circuit 620, and a register 632, wherein a phase adjustment circuit 621 is disposed in the clock generation circuit 620. The timing controller Tcon includes a data transmission circuit 640, a command generation circuit 650, a computation circuit 633, and a determination circuit 634, wherein a phase-adjustment command generation circuit 651 is disposed in the command generation circuit 650 and is coupled to the phase adjustment circuit 621. The data transmission circuit 640 transmits a data signal DATA to the data reception circuit 610 and the clock generation circuit 620 in step S610. The data reception circuit 610 receives the data signal DATA, a clock signal CLK_0, and an auxiliary clock signal CLK_1, and latches an edge sampling result Edge[N] (or a complement of the edge sampling result Edge[N]) in step S620. Moreover, in step S630, the computation circuit 633 performs an accumulation operation on the edge information to generate a temporary value REG1. Next, the determination circuit 634 receives the temporary value REG1 in step S640, and determines in step S650 whether a phase relationship between the data signal DATA and the clock signal CLK_0 at this time is lagging or leading. Lastly, the phase-adjustment command generation circuit 651 generates an adjustment command Act in step S660. The phase adjustment circuit 621 receives the adjustment command Act and adjusts a phase of the clock signal CLK_0 according to the adjustment command Act to generate an adjusted clock signal, and the data signal DATA is sampled according to the adjusted clock signal to obtain a plurality of transmission data.

Figure 7:
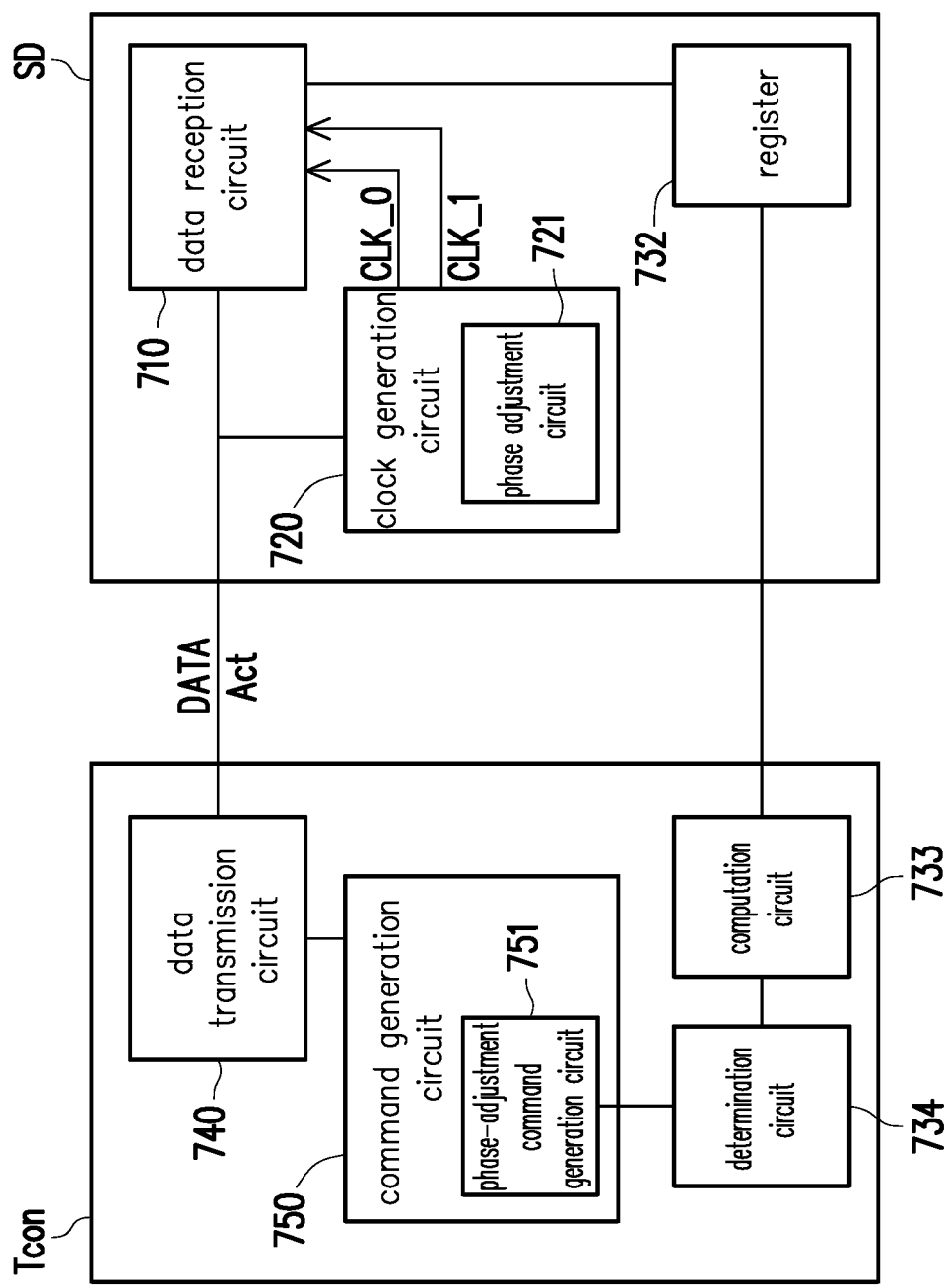
FIG. 7 is a circuit block schematic diagram illustrating another implementation of the data capture device of the embodiment of FIG. 6A.

Referring to FIG. 7, FIG. 7 is a circuit block schematic diagram illustrating another implementation of the data capture device of the embodiment of FIG. 6A. The difference from the embodiment of FIG. 6A lies in that, in the present embodiment, a transmission line configured to transmit a control command (e.g., an adjustment command Act) is integrated in a transmission line configured to transmit data (e.g., a data signal DATA) to simplify the data capture device.

A data capture device 700 of the present embodiment includes a timing controller Tcon and a source driver SD coupled to each other. The source driver SD includes a data reception circuit 710, a clock generation circuit 720, and a register 732, wherein a phase adjustment circuit 721 is disposed in the clock generation circuit 720. The timing controller Tcon includes a data transmission circuit 740, a command generation circuit 750, a computation circuit 733, and a determination circuit 734, wherein a phase-adjustment command generation circuit 751 is disposed in the command generation circuit 750, and the command generation circuit 750 is coupled to the data transmission circuit 740.

Operations of the data capture device 700 are similar to the operations of the data capture device 600 and shall not be repeatedly described here.

Referring to FIG. 8A to FIG. 8F, FIG. 8A to FIG. 8F are schematic diagrams illustrating correspondences between data states and equalization intensities at the time of data transition according to an embodiment of the invention. Specifically, referring to FIG. 8A to FIG. 8C, FIG. 8A to FIG. 8C illustrate correspondences between the data states and the equalization intensities when the data signal DATA undergoes a transition from a low logic level to a high logic level and then to the low logic level. When the change among three adjacent data states Data[N−1], Data[N], and Data[N+1] is sequentially 0, 1, and 0, the pieces of edge information identical to the edge sampling results Edge[N] are generated according to the change among the three adjacent data states Data[N−1], Data[N], and Data[N+1] from 0 to 1 to 0.

In FIG. 8A, using a single time cycle as an example, when the data signal DATA is in a state of a smaller equalization intensity with respect to the clock signal CLK_0, the edge sampling result Edge[N] sampled according to the positive transition edge of the auxiliary clock signal CLK_1 should be 0. In FIG. 8B, similarly using a single time cycle as an example, when the equalization intensities of the data signal DATA and the clock signal CLK_0 are equal, the edge sampling result Edge[N] sampled according to the positive transition edge of the auxiliary clock signal CLK_1 may be 0 or may be 1. In FIG. 8C, similarly using a single time cycle as an example, when the data signal DATA is in a state of a larger equalization intensity with respect to the clock signal CLK_0, the edge sampling result Edge[N] sampled according to the positive transition edge of the auxiliary clock signal CLK_1 should be 1.

According to the description above, under the condition that the change among the data states Data[N−1], Data[N], and Data[N+1] is 0 to 1 to 0, in a single correction time period, a temporary value is generated by accumulating the plurality of pieces of edge information of a plurality of time cycles, and a sampling total count of sampling the data signal according to the clock signal or the auxiliary clock signal is calculated. Moreover, an equalization intensity state of the data signal DATA may be learned according to a magnitude of the temporary value. In other words, when a ratio (generated by dividing the temporary value by the sampling total count) is not smaller than 0 and is smaller than a first threshold value, it means that the data signal DATA is in a state of a smaller equalization intensity with respect to the clock signal CLK_0. When the ratio is not smaller than the first threshold value and the ratio is smaller than a second threshold value, it means that the clock signal CLK_0 and the data signal DATA are in a state of equal equalization intensities. When the ratio is not smaller than the second threshold value, it means that the data signal DATA is in a state of a larger equalization intensity with respect to the clock signal CLK_0.

On the other hand, referring to FIG. 8D to FIG. 8F, FIG. 8D to FIG. 8F illustrate correspondences between the data states and the equalization intensities when the data signal DATA undergoes a transition from a high logic level to a low logic level and then to the high logic level. When the state among the three adjacent data states Data[N−1], Data[N], and Data[N+1] is sequentially 1, 0, and 1, the pieces of edge information which are complements of the edge sampling results Edge[N] are generated according to the change among the three adjacent data states Data[N−1], Data[N], and Data[N+1] from 1 to 0 to 1.

In other words, in FIG. 8D, using a single time cycle as an example, when the data signal DATA is in a state of a smaller equalization intensity with respect to the clock signal CLK_0, the edge sampling result Edge[N] sampled according to the positive transition edge of the auxiliary clock signal CLK_1 should be 1. In FIG. 8E, similarly using a single time cycle as an example, when the equalization intensities of the data signal DATA and the clock signal CLK_0 are equal, the edge sampling result Edge[N] sampled according to the positive transition edge of the auxiliary clock signal CLK_1 may be 1 or may be 0. In FIG. 8F, similarly using a single time cycle as an example, when the data signal DATA is in a state of a larger equalization intensity with respect to the clock signal CLK_0, the edge sampling result Edge[N] sampled according to the positive transition edge of the auxiliary clock signal CLK_1 should be 0.

According to the description above, under the condition that the change among the data states Data[N−1], Data[N], and Data[N+1] is 1 to 0 to 1, the equalization intensities of the data signal DATA with respect to the clock signal CLK_0 are determined similarly based on a comparison result between the ratio and the first threshold value and the second threshold value. The difference from the condition that the change among the data states Data[N−1], Data[N], and Data[N+1] is 0 to 1 to 0 in FIG. 8A to FIG. 8C merely lies in that the pieces of edge information for performing the accumulation operation are the complements of the edge sampling results Edge[N].

Figure 9:
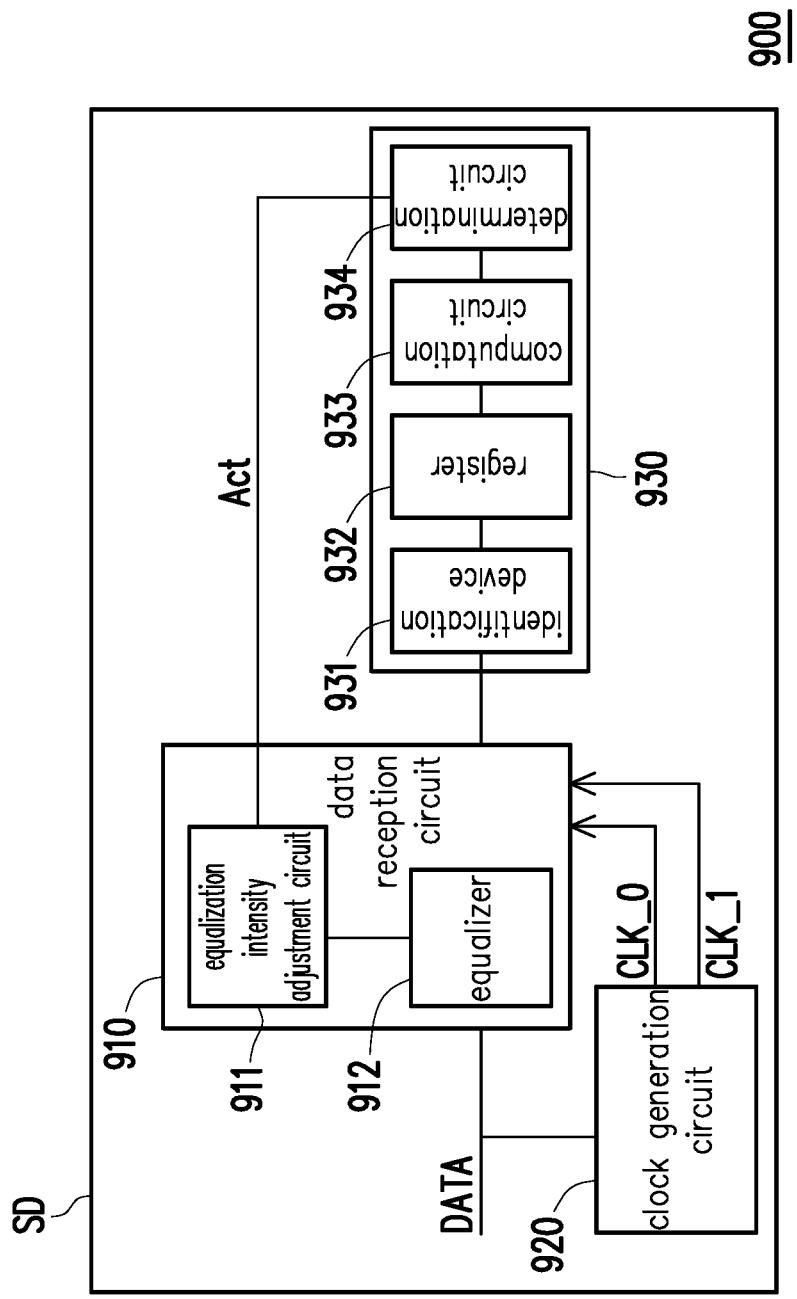
FIG. 9 is a circuit block schematic diagram illustrating an implementation of adjusting an equalization intensity of a data capture device according to another embodiment of the invention.

Referring to FIG. 9, FIG. 9 is a circuit block schematic diagram illustrating an implementation of adjusting an equalization intensity of a data capture device according to another embodiment of the invention. The difference from the embodiment of FIG. 4A lies in that, in the present embodiment, a data reception circuit 910 of a data capture device 900 additionally includes an equalization intensity adjustment circuit 911 and an equalizer 912, and an adjusted clock signal is generated by adjusting an equalization intensity of a clock signal CLK_0. Specifically, in the present embodiment, a source driver SD of the data capture device 900 includes the data reception circuit 910, a clock generation circuit 920, and a control circuit 930. The clock generation circuit 920 is coupled to the data reception circuit 910, and the control circuit 930 is coupled to the clock generation circuit 920 and the data reception circuit 910. The data reception circuit 910 includes the equalization intensity adjustment circuit 911 and the equalizer 912. The control circuit 930 includes an identification device 931, a register 932, a computation circuit 933, and a determination circuit 934 coupled to each other.

The data reception circuit 910 of the source driver SD perform is an operation of receiving a data signal DATA. Next, the identification device 931 performs a latch operation on a plurality of data states Data[N−1], Data[N], and Data[N+1] and a plurality of edge sampling results Edge[N−1], Edge[N], and Edge[N+1]. Moreover, a determination is performed on the three adjacent data states Data[N−1], Data[N], and Data[N+1]. If a condition that Data[N−1] is 0, Data[N] is 1, and Data[N+1] is 0 is met (i.e., a state of the data signal DATA is a 0-to-1-to-0 mode), edge information identical to the edge sampling result Edge[N] is generated. Conversely, if the three adjacent data states meet a condition that Data[N−1] is 1, Data[N] is 0, and Data[N+1] is 1, edge information which is a complement of the edge sampling result Edge[N] is generated.

Moreover, the computation circuit 933 performs an accumulation operation on the edge information to generate a temporary value REG2 and performs an accumulation operation of a sampling total count count_2. If the sampling total count count_2 reaches a second threshold count Nth_2, the computation circuit 933 performs a division operation on the temporary value REG2 and the sampling total count count_2 to generate a ratio Ratio_2. The determination circuit 934 generates a comparison result according to a magnitude relationship between the ratio Ratio_2 and a default first threshold value Thedg1 and a default second threshold value Thedg2, and generates an adjustment command Act according to the comparison result. The equalization intensity adjustment circuit 911 then adjusts an equalization intensity of the clock signal CLK_0 according to the adjustment command Act to generate an adjusted clock signal. Moreover, the data signal DATA is sampled according to the adjusted clock signal to obtain a plurality of transmitting data.

TABLE 2

| Comparison result | Equalization intensity adjustment operation |
|---|---|
| 0 ≤ Ratio_2 < Theq1 | Increasing equalization intensity |
| Theq1 ≤ Ratio_2 ≤ Theq2 | Maintaining equalization intensity |
| Theq2 < Ratio_2 ≤ 1 | Reducing equalization intensity |

In Table 2, the comparison result refers to a result generated after comparing the magnitude relationship between the ratio Ratio_2 and the default first threshold value Thedg1 and second threshold value Thedg2, and the equalization intensity adjustment operation refers to an operation required for adjusting the equalization intensity of the clock when different comparison results are obtained based on the ratio Ratio_2.

Regarding details of the adjustment operation, when the ratio Ratio_2 is larger than or equal to 0 and the ratio Ratio_2 is smaller than the first threshold value Thedg1, the adjustment command Act for increasing the equalization intensity of the clock signal CLK_0 is generated to adjust the clock signal CLK_0. When the ratio Ratio_2 is larger than or equal to the first threshold value Thedg1 and the ratio Ratio_2 is smaller than the second threshold value Thedg2, the adjustment command Act for maintaining the equalization intensity of the clock signal CLK_0 is generated to adjust the clock signal CLK_0. When the ratio Ratio_2 is larger than or equal to the second threshold value Thedg2, the adjustment command Act for reducing the equalization intensity of the clock signal CLK_0 is generated to adjust the clock signal CLK_0.

Figure 10:
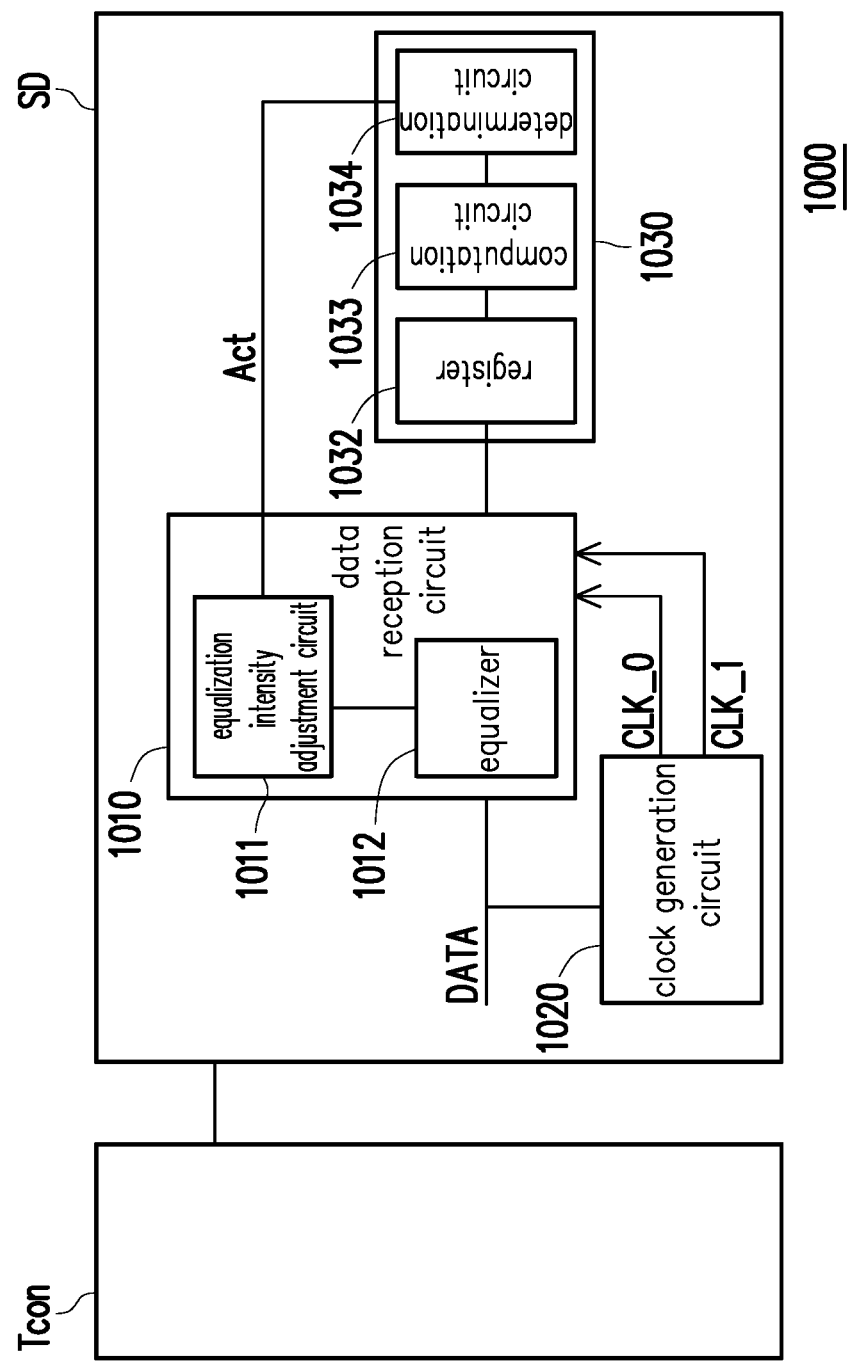
FIG. 10 is a circuit block schematic diagram illustrating an implementation of adjusting an equalization intensity of a data capture device according to another embodiment of the invention.

Referring to FIG. 10, FIG. 10 is a circuit block schematic diagram illustrating an implementation of adjusting an equalization intensity of a data capture device according to another embodiment of the invention. The difference from the embodiment of FIG. 9 lies in that, in the present embodiment, the identification device 931 in the data capture device 900 is integrated and is replaced with a timing controller Tcon of a data capture device 1000 of the present embodiment. Therefore, in the present embodiment, by setting the timing controller Tcon and a source driver SD to perform a transition from 0 to 1 to 0 (or a transition from 1 to 0 to 1) at a predetermined bit address, edge information is generated directly according to an edge sampling result Edge[N] sampled at the predetermined bit address (or a complement of the edge sampling result Edge[N]), and an accumulation operation is performed on the edge information to generate the temporary value REG2, which simplifies the process of the data capture method described in the foregoing embodiment.

The data capture device 1000 of the present embodiment includes the timing controller Tcon and the source driver SD. The source driver SD includes a data reception circuit 1010, a clock generation circuit 1020, and a control circuit 1030. The clock generation circuit 1020 is coupled to the data reception circuit 1010, and the control circuit 1030 is coupled to the clock generation circuit 1020 and the data reception circuit 1010. The data reception circuit 1010 includes an equalization intensity adjustment circuit 1011 and an equalizer 1012 coupled to each other. The control circuit 1030 includes a register 1032, a computation circuit 1033, and a determination circuit 1034 coupled to each other.

Operations of the data capture device 1000 are similar to the operations of the data capture device 900 and shall not be repeatedly described here.

Figure 11:
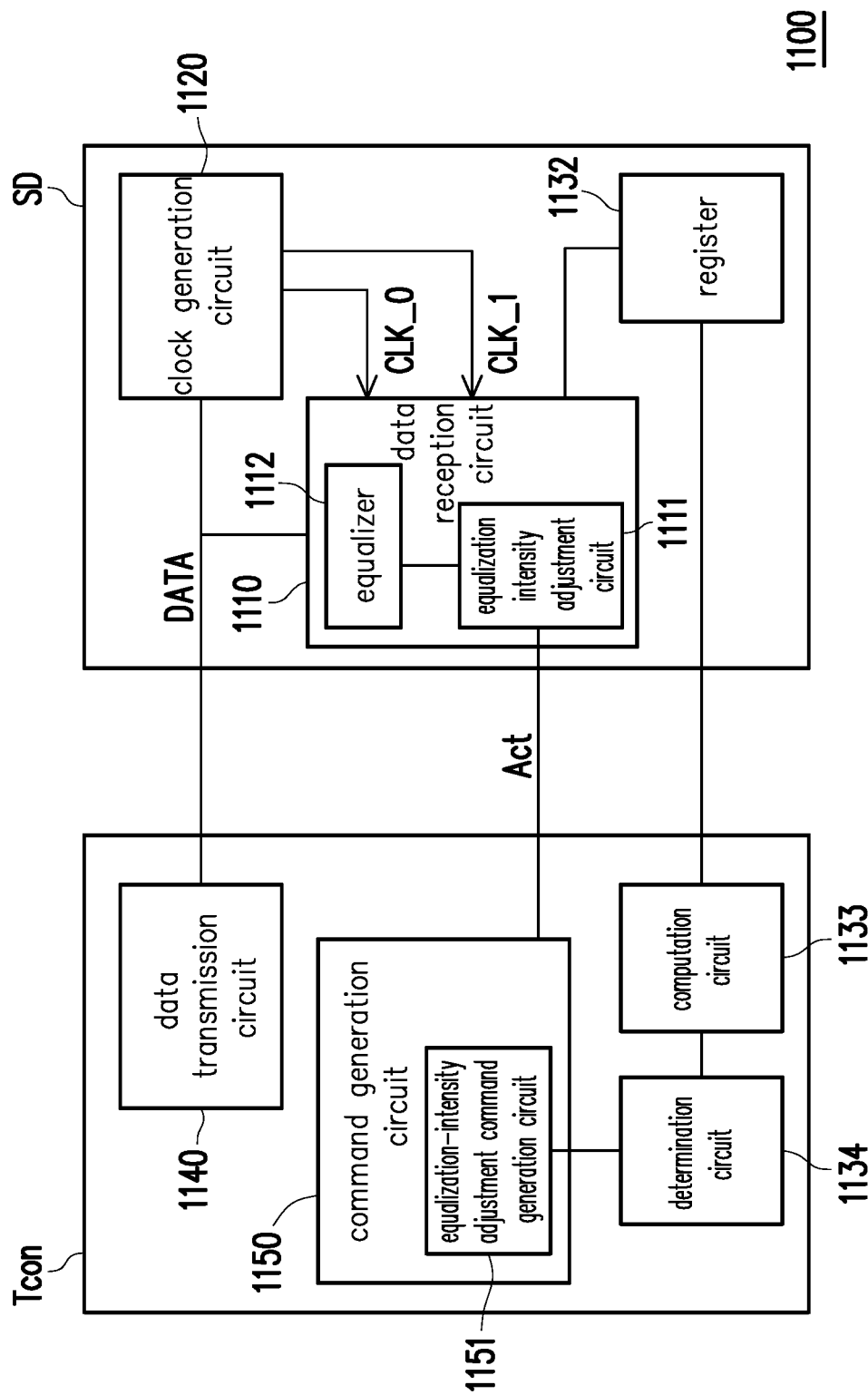
FIG. 11 is a circuit block schematic diagram illustrating an implementation of adjusting an equalization intensity of a data capture device according to another embodiment of the invention.

Referring to FIG. 11, FIG. 11 is a circuit block schematic diagram illustrating an implementation of adjusting an equalization intensity of a data capture device according to another embodiment of the invention. The difference from the embodiment of FIG. 10 lies in that, in the present embodiment, the computation circuit 1033 and the determination circuit 1034 in the data capture device 1000 are integrated in a timing controller Tcon of a data capture device 1100 of the present embodiment, which simplifies a circuit of a source driver SD.

The data capture device 1100 of the present embodiment includes the timing controller Tcon and the source driver SD coupled to each other. The source driver SD includes a data reception circuit 1110, a clock generation circuit 1120, and a register 1132, wherein an equalization intensity adjustment circuit 1111 and an equalizer 1112 coupled to each other are disposed in the data reception circuit 1110. The timing controller Tcon includes a data transmission circuit 1140, a command generation circuit 1150, a computation circuit 1133, and a determination circuit 1134, wherein an equalization-intensity adjustment command generation circuit 1151 is disposed in the command generation circuit 1150 and is coupled to the data reception circuit 1110.

Regarding operations of the data capture device 1100, the difference from the data capture device 600 merely lies in that, in the present embodiment, the equalization intensity adjustment circuit 1111 of the data capture device 1100 generates an adjusted clock signal by adjusting an equalization intensity of a clock signal CLK_0. The rest of circuit operations are similar to the operations of the data capture device 600 and shall not be repeatedly described here.

Figure 12:
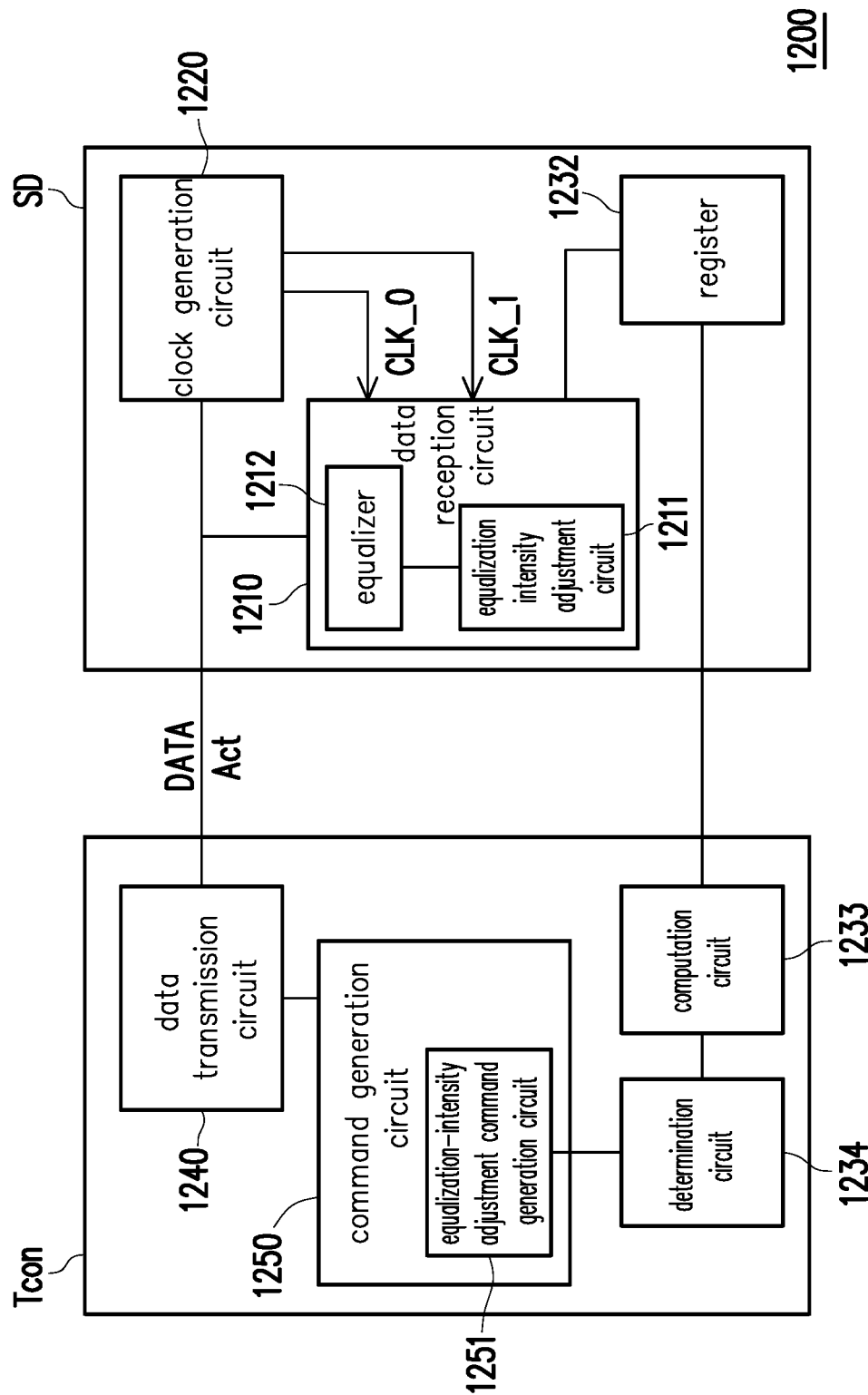
FIG. 12 is a circuit block schematic diagram illustrating another implementation of the data capture device of the embodiment of FIG. 11.

Referring to FIG. 12, FIG. 12 is a circuit block schematic diagram illustrating another implementation of the data capture device of the embodiment of FIG. 11. The difference from the embodiment of FIG. 11 lies in that, in the present embodiment, a transmission line configured to transmit a control command (e.g., an adjustment command Act) is integrated in a transmission line configured to transmit data (e.g., a data signal DATA) to simplify the data capture device.

A data capture device 1200 of the present embodiment includes a timing controller Tcon and a source driver SD coupled to each other. The source driver SD includes a data reception circuit 1210, a clock generation circuit 1220, and a register 1232, wherein an equalization intensity adjustment circuit 1211 and an equalizer 1212 coupled to each other are disposed in the data reception circuit 1210. The timing controller Tcon includes a data transmission circuit 1240, a command generation circuit 1250, a computation circuit 1233, and a determination circuit 1234, wherein an equalization-intensity adjustment command generation circuit 1251 is disposed in the command generation circuit 1250 and is coupled to the data transmission circuit 1240.

Operations of the data capture device 1200 are similar to the operations of the data capture device 1100 and shall not be repeatedly described here.

In summary of the above, in the embodiments of the invention, the data state of the data signal is sampled by additionally including an auxiliary clock signal having a phase different from the clock signal in the data capture device. Moreover, the edge information is generated according to the sampled edge sampling result, and then the accumulation operation is performed on the edge information to generate the temporary value. In addition, it is determined whether the phase of the current clock signal is leading or lagging with respect to the data signal (or whether the equalization intensity of the data signal is larger or smaller with respect to the clock signal) according to the accumulated temporary value, and then the adjustment command is generated according to the different phase relationships between the current clock signal and the data signal (or the different equalization intensities of the clock signal and the data signal). Lastly, the clock phase (or the equalization intensity) of the clock signal is adjusted according to the adjustment command to enable the data capture device to learn to autonomously adjust completeness of signals, such that accuracy of the received data can all be ensured in various operation environments, and use at higher data transmission rates can be possible.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A data capture method comprising:
receiving a data signal and a clock signal corresponding to the data signal;
generating an auxiliary clock signal according to the clock signal, wherein phases of the clock signal and the auxiliary clock signal are different;
sampling the data signal respectively according to the clock signal and the auxiliary clock signal to respectively obtain a plurality of data states and a plurality of edge sampling results;
generating a plurality of pieces of edge information according to the data states and the edge sampling results respectively corresponding to the data states, and performing an accumulation operation according to the pieces of edge information to generate a temporary value; and
adjusting the clock signal according to the temporary value to generate an adjusted clock signal, and sampling the data signal according to the adjusted clock signal to obtain a plurality of transmission data.

2. The data capture method according to claim 1, wherein the step of generating the auxiliary clock signal according to the clock signal comprises:
inverting the clock signal to generate the auxiliary clock signal.

3. The data capture method according to claim 1, wherein the clock signal is an externally received clock signal or is an embedded clock signal.

4. The data capture method according to claim 1, wherein the step of generating the pieces of edge information according to the data states and the edge sampling results respectively corresponding to the data states comprises:
configuring the edge sampling results between two adjacent data states to be equal to the corresponding pieces of edge information, when the two adjacent data states are sequentially a first logic level and a second logic level; and
generating the corresponding pieces of edge information according to the edge sampling results corresponding in an inverted manner, when the two adjacent data states are sequentially the second logic level and the first logic level,
wherein the first logic level is a low logic level, and the second logic level is a high logic level.

5. The data capture method according to claim 1, wherein the step of generating the pieces of edge information according to the data states and the edge sampling results respectively corresponding to the data states comprises:
configuring the edge sampling results corresponding to three adjacent data states to be equal to the corresponding pieces of edge information, when the three adjacent data states are sequentially a first logic level, a second logic level, and the first logic level; and
generating the corresponding pieces of edge information according to the edge sampling results corresponding to the three adjacent data states in an inverted manner, when the three adjacent data states are sequentially the second logic level, the first logic level, and the second logic level,
wherein the first logic level is a low logic level, and the second logic level is a high logic level.

6. The data capture method according to claim 1, wherein the step of performing the accumulation operation according to the pieces of edge information to generate the temporary value comprises:
adding up the pieces of edge information to generate the temporary value in a correction time period.

7. The data capture method according to claim 1, wherein the step of adjusting the clock signal according to the temporary value to generate the adjusted clock signal comprises:
calculating a sampling total count of sampling the data signal according to the clock signal or the auxiliary clock signal in a correction time period;
performing a division operation on the temporary value and the sampling total count to generate a ratio;
comparing a magnitude relationship between the ratio and a default first threshold value and a default second threshold value and generating a comparison result; and
adjusting a phase or an equalization intensity of the clock signal according to the comparison result to generate the adjusted clock signal,
wherein the first threshold value is smaller than the second threshold value, and the first threshold value is larger than 0.

8. The data capture method according to claim 7, wherein the step of adjusting the phase or the equalization intensity of the clock signal according to the comparison result to generate the adjusted clock signal comprises:
advancing the phase of the clock signal to generate the adjusted clock signal, when the ratio is larger than or equal to 0 and the ratio is smaller than the first threshold value;
holding the phase of the clock signal unchanged to generate the adjusted clock signal, when the ratio is larger than or equal to the first threshold value and the ratio is smaller than the second threshold value; and
delaying the phase of the clock signal to generate the adjusted clock signal, when the ratio is larger than or equal to the second threshold value.

9. The data capture method according to claim 7, wherein the step of adjusting the phase or the equalization intensity of the clock signal according to the comparison result to generate the adjusted clock signal comprises:
increasing the equalization intensity of the clock signal to generate the adjusted clock signal, when the ratio is larger than or equal to 0 and the ratio is smaller than the first threshold value;
maintaining the equalization intensity of the clock signal to generate the adjusted clock signal, when the ratio is larger than or equal to the first threshold value and the ratio is smaller than the second threshold value; and
reducing the equalization intensity of the clock signal to generate the adjusted clock signal, when the ratio is larger than or equal to the second threshold value.

10. A data capture device comprising:
a data reception circuit, receiving a data signal, a clock signal corresponding to the data signal, and an auxiliary clock signal to sample the data signal respectively according to the clock signal and the auxiliary clock signal to respectively obtain a plurality of data states and a plurality of edge sampling results;

a clock signal generation circuit, coupled to the data reception circuit and generating the auxiliary clock signal according to the clock signal, wherein phases of the clock signal and the auxiliary clock signal are different; and a control circuit, coupled to the data reception circuit and the clock signal generation circuit and configured to:

generate a plurality of pieces of edge information according to the data states and the edge sampling results respectively corresponding to the data states, and perform an accumulation operation according to the pieces of edge information to generate a temporary value; and generate an adjustment command according to the temporary value and transmit the adjustment command to the clock signal generation circuit, wherein the clock signal generation circuit adjusts the clock signal according to the adjustment command to generate an adjusted clock signal, and the data reception circuit receives the adjusted clock signal and samples the data signal according to the adjusted clock signal to obtain a plurality of transmission data.

11. The data capture device according to claim 10, wherein the clock signal generation circuit inverts the clock signal to generate the auxiliary clock signal.

12. The data capture device according to claim 10, wherein the clock signal is an externally received clock signal or is an embedded clock signal.

13. The data capture device according to claim 10, wherein the control circuit comprises:

an identification device, configuring the corresponding edge sampling results to be equal to the corresponding pieces of edge information when two adjacent data states are sequentially a first logic level, and a second logic level, and generating the corresponding pieces of edge information according to the edge sampling results corresponding in an inverted manner when the two adjacent data states are sequentially the second logic level and the first logic level, wherein the data states are generated before the corresponding edge sampling results, wherein the first logic level is a low logic level, and the second logic level is a high logic level.

14. The data capture device according to claim 10, wherein the control circuit comprises:

an identification device, configuring the edge sampling results corresponding to three adjacent data states to be equal to the corresponding pieces of edge information when the three adjacent data states are sequentially a first logic level, a second logic level, and the first logic level, and generating the corresponding pieces of edge information according to the edge sampling results corresponding to the three adjacent data states in an inverted manner when the three adjacent data states are sequentially the second logic level, the first logic level, and the second logic level, wherein the first logic level is a low logic level, and the second logic level is a high logic level.

15. The data capture device according to claim 13, wherein the control circuit further comprises:

a computation circuit, adding up the pieces of edge information to generate the temporary value in a correction time period; and a register, coupled to the computation circuit and configured to store the temporary value.

16. The data capture device according to claim 15, wherein the computation circuit is further configured to:

calculate a sampling total count of sampling the data signal according to the clock signal or the auxiliary clock signal in the correction time period; and perform a division operation on the temporary value and the sampling total count to generate a ratio.

17. The data capture device according to claim 16, wherein the control circuit further comprises:

a determination circuit, coupled to the computation circuit, comparing a magnitude relationship between the ratio and a default first threshold value and a default second threshold value to generate a comparison result, and generating the adjustment command according to the comparison result, wherein the first threshold value is smaller than the second threshold value, and the first threshold value is larger than 0.

18. The data capture device according to claim 17, wherein the determination circuit is configured to:

generate the adjustment command for advancing a phase of the clock signal to generate the adjusted clock signal, when the ratio is larger than or equal to 0 and the ratio is smaller than the first threshold value;

generate the adjustment command for holding the phase of the clock signal unchanged to generate the adjusted clock signal, when the ratio is larger than or equal to the first threshold value and the ratio is smaller than the second threshold value; and generating the adjustment command for delaying the phase of the clock signal to generate the adjusted clock signal, when the ratio is larger than or equal to the second threshold value.

19. The data capture device according to claim 10, wherein the data reception circuit comprises:

a phase adjustment circuit, receiving the adjustment command and adjusting the phase of the clock signal according to the adjustment command to generate the adjusted clock signal.

20. The data capture device according to claim 10, wherein the data reception circuit comprises:

an equalization intensity adjustment circuit, receiving the adjustment command and setting an equalization intensity according to the adjustment command; and an equalizer, coupled to the equalization intensity adjustment circuit and adjusting the clock signal according to the equalization intensity to generate the adjusted clock signal.

* * * * *